US012409646B2

(12) United States Patent
Schwab

(10) Patent No.: US 12,409,646 B2
(45) Date of Patent: Sep. 9, 2025

(54) DEVICE FOR MEASURING ELEVATED AREAS OF THE SURFACE OF A ROTARY BODY AND SYSTEM HAVING THE DEVICE

(71) Applicant: HEIDELBERGER DRUCKMASCHINEN AG, Heidelberg (DE)

(72) Inventor: Werner Schwab, Bechtsrieth (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 698 days.

(21) Appl. No.: 16/871,456

(22) Filed: May 11, 2020

(65) Prior Publication Data
US 2020/0353742 A1    Nov. 12, 2020

(30) Foreign Application Priority Data

May 9, 2019    (DE) .......................... 102019206705

(51) Int. Cl.
*B41F 33/00*    (2006.01)
*B41F 5/24*    (2006.01)
(Continued)

(52) U.S. Cl.
CPC ................ *B41F 33/00* (2013.01); *B41F 5/24* (2013.01); *B41F 13/12* (2013.01);
(Continued)

(58) Field of Classification Search
CPC .. B41F 5/24; B41F 13/12; B41F 33/00; B41F 33/0027; B41F 33/0081; B41P 2233/13; B41P 2227/30; G01B 11/2433
See application file for complete search history.

(56) References Cited

U.S. PATENT DOCUMENTS 3,840,301 A * 10/1974 Pryor .................. G01B 11/245
                                                  356/505
4,916,824 A *  4/1990 Shimazutsu .......... G01B 7/287
                                                  33/551
(Continued)

FOREIGN PATENT DOCUMENTS

CN          101090821 A      12/2007
CN          102381013 A       3/2012
(Continued)

*Primary Examiner* — Jill E Culler
(74) *Attorney, Agent, or Firm* — Laurence A. Greenberg; Werner H. Stemer; Ralph E. Locher

(57) ABSTRACT

A device for measuring elevated areas of the surface of a rotary body in the form of a cylinder, a roller, a sleeve or a plate of a printing press, for example a flexographic printing plate, includes a first motor for rotating the rotary body about a rotational axis and a measuring unit for contactless measurement. The measuring unit for contactless measurement includes at least one radiation source and at least one area scan camera. The measuring unit for contactless measurement preferably includes a reference object, for example a wire tensioned in an axially parallel manner, a second motor and optionally a further second motor, for adjusting the measuring unit and/or the reference object perpendicularly to the rotational axis. The device makes it possible to measure elevated areas, for example flexographic print dots, quickly and with high precision. A system having the device is also provided.

14 Claims, 8 Drawing Sheets

(51) Int. Cl.
*B41F 13/12* (2006.01)
*G01B 11/24* (2006.01)

(52) U.S. Cl.
CPC ...... *B41F 33/0081* (2013.01); *G01B 11/2433* (2013.01); *B41F 33/0027* (2013.01); *B41P 2227/30* (2013.01); *B41P 2233/13* (2013.01)

(56) References Cited

U.S. PATENT DOCUMENTS

| | | | |
|---|---|---|---|
| 5,617,645 A * | 4/1997 | Wick | G01B 11/27 33/551 |
| 6,169,290 B1 | 1/2001 | Rosberg et al. | |
| 6,442,857 B1 * | 9/2002 | Atsuhiko | G01B 5/285 33/1 M |
| 7,464,645 B2 | 12/2008 | Jeschonneck et al. | |
| 8,534,194 B2 | 9/2013 | Whitelaw et al. | |
| 9,259,914 B2 | 2/2016 | Resentera et al. | |
| 2005/0135706 A1 * | 6/2005 | Sengupta | G01B 11/2433 382/286 |
| 2007/0089625 A1 | 4/2007 | Grinberg et al. | |
| 2007/0240597 A1 | 10/2007 | Grinberg et al. | |
| 2008/0141886 A1 | 6/2008 | Whitelaw et al. | |
| 2010/0001978 A1 | 1/2010 | Whitelaw et al. | |
| 2012/0210895 A1 | 8/2012 | Loddenkoetter | |
| 2014/0251169 A1 | 9/2014 | Loddenkoetter | |
| 2015/0106054 A1 | 4/2015 | Sambri | |
| 2016/0318297 A1 | 11/2016 | Whitelaw et al. | |
| 2018/0079200 A1 | 3/2018 | Frati et al. | |

FOREIGN PATENT DOCUMENTS

| | | |
|---|---|---|
| CN | 103547453 A | 1/2014 |
| CN | 107848293 A | 3/2018 |
| DE | 3302789 A1 | 8/1983 |
| DE | 102006050274 A1 | 5/2008 |
| DE | 102006060464 A1 | 7/2008 |
| DE | 202007004717 U1 | 9/2008 |
| DE | 102014215648 A1 | 2/2016 |
| EP | 1007904 A1 | 6/2000 |
| EP | 2428360 A1 | 3/2012 |
| EP | 3261850 A1 | 1/2018 |
| GB | 2113975 A | 8/1983 |
| JP | 2000211114 A | 8/2000 |
| JP | 2004170394 A * | 6/2004 |
| JP | 2006256176 A | 9/2006 |
| WO | 9910708 A1 | 3/1999 |
| WO | 2008049510 A1 | 5/2008 |
| WO | 2010063370 A1 | 6/2010 |
| WO | 2010146040 A1 | 12/2010 |
| WO | 2011138466 A1 | 11/2011 |
| WO | 2013076526 A1 | 5/2013 |
| WO | 2014162215 A1 | 10/2014 |
| WO | 2016135416 A1 | 9/2016 |

\* cited by examiner

DEVICE FOR MEASURING ELEVATED AREAS OF THE SURFACE OF A ROTARY BODY AND SYSTEM HAVING THE DEVICE

CROSS-REFERENCE TO RELATED APPLICATION

This application claims the priority, under 35 U.S.C. § 119, of German Patent Application DE 10 2019 206 705, filed May 9, 2019; the prior application is herewith incorporated by reference in its entirety.

BACKGROUND OF THE INVENTION

Field of the Invention

The invention relates to a device for measuring elevated areas of the surface of a rotary body, configured as a cylinder, a roller, a sleeve or a plate for a printing press, including a first motor for rotating the rotary body about a rotational axis and a measuring unit. The invention also relates to a system including the device.

The invention resides in the technical field of the graphics industry and there, in particular, in the area of measuring rotary bodies, such as cylinders, rollers, sleeves, preferably laser-engraved flexographic printing sleeves, or plates, preferably flexographic printing plates mounted on sleeves. During measurement, elevated areas of the rotary body are detected.

Description of the Related Art

German Patent Application DE 33 02 789 A1, corresponding to UK Patent GB 2 113 975B, discloses the detection of the area coverage or of the printing and non-printing zones in connection with register presetting to shorten the set-up time.

German Patent Application DE 10 2014 215 648A1 discloses a rotary printing press including a central impression cylinder, which can be rotated about a rotational axis, at least one, and preferably multiple printing decks, which are disposed around the central impression cylinder, wherein each printing deck includes a print roller having a reference mark, and at least one sensor for detecting the reference mark. The sensor is disposed on a separate rotating device, by way of which the sensor can be rotated about the rotational axis.

European Patent Application EP 3 251 850 A1 discloses a so-called mounter for determining registration data of a sleeve of a flexographic printing press which is provided with a printing form and a registration mark, including a shaft on which the sleeve can be fixed, a detection unit, such as a 3D scanner, for scanning the surface profile of the printing form, and a processing unit, in which the scanned surface profile of the printing form is associated with a stored target profile and, as a function of the association, the registration data is calculated with reference to the registration mark.

German Patent Application DE 10 2006 060 464A1, corresponding to U.S. Pat. No. 8,534,194 and to U.S. Patent Application Publication Nos. 2008/0141886, 2010/0011978 and 2016/0318297, discloses a rotary printing machine including a number of ink decks, of which at least one includes a roller, such as a flexographic printing cylinder or an anilox roller, and a setting system for setting the position of the roller relative to at least one other component of the printing press. The at least one ink deck includes a control unit, which is configured to receive and process data about the roller, which describes the topography of the surface of that specific roller and/or a spatial relationship between a printing pattern and a reference mark formed on the roller. The control unit is furthermore configured to activate the setting system in agreement with that setting data so as to set the roller to an optimal position for printing without waste, or at least with reduced waste. The topography of the cylinder surface can be determined or scanned by way of a moving laser head (for laser triangulation or laser interferometry). One objective is to determine the target linear pressure for presetting (or register presetting) and, based thereon, avoid the production of waste. Settings values used for that purpose can be stored on an RFID chip. It is also possible to determine printing and non-printing zones. German Utility Model DE 20 2007 004 717U1 from the same patent family discloses scanning rolls as sensors, or the measurement by way of a laser micrometer as a sensor according to the shadow technique, as alternatives for scanning the topography. Chinese Patent Application CN102381013A from the same patent family discloses a method for setting a printing plate cylinder and an embossing roller in a rotary printing press, including the following steps: rotatably mounting the printing plate cylinder; scanning the circumferential surface of the printing plate cylinder; deriving and storing data used for setting the printing plate cylinder; rotatably mounting the embossing roller; scanning the circumferential surface of the embossing roller; deriving and storing data used for setting the embossing roller from the topography of the surface of the embossing roller, and storing the settings data; mounting the printing plate cylinder and the embossing roller in the printing press; and setting the printing plate cylinder and the embossing roller according to the settings data.

A system sold by the company Bobst for so-called "registration and impression setting" under the name "smart-GPS®" operates based on scanning rolls, which make contact with the printing plate to be measured. However, a desire exists on the part of the customer to measure printing plates in a contactless manner and thus, in any case, without damage, even in the case of very fine print dots.

International Publication WO2010/146040A1 discloses a similar approach, wherein a camera and an evaluation algorithm in the form of a target-actual value comparison (measured radii compared to theoretical radii) are used.

International Publication WO2008/049510A1 discloses a method and a device for checking the quality of at least one printing form cylinder. Automatically carrying out the necessary quality assurance measures is made possible in that the printing form cylinder is transferred into a detection device in which the surface of the printing form cylinder is optically scanned in an automated manner, and the diameter or the circumference of the printing cylinder and/or the roughness of the surface thereof are measured by way of automatic measuring instruments. For example, the printed image is checked for the ink density thereof.

When printing by using flexographic printing plates inked by anilox rollers and mounted on sleeves, or using printing sleeves, a number of variable quantities are known: variances in the size of the anilox roller and the circumference thereof; variances in the thickness of the printing plate across the working width and in the unwinding; variances in the sleeve across the working width and in terms of the concentricity; eccentricity; variances in the mounting of the printing plate by way of adhesive tape. The working pressure between the anilox roller and the printing cylinder (including the sleeve, adhesive surfaces and printing plate), and between the printing cylinder and the impression cylinder (including the print substrate between them) and, as a result, the print result can be influenced, and in particular impaired, by those variances.

As a result, a variety of systems for measuring are known. Nonetheless, the market continuously calls for innovations, in particular so as to be able to produce even higher quality print products more quickly and more cost-effectively. The known systems are not always able to fully satisfy that need.

SUMMARY OF THE INVENTION

It is accordingly an object of the invention to provide a device for measuring elevated areas of the surface of a rotary body and a system having the device, which overcome the hereinafore-mentioned disadvantages of the heretofore-known devices and systems of this general type and which, in particular, make it possible to measure elevated areas of rotary bodies, such as flexographic print dots of a flexographic printing plate, quickly and with high precision.

With the foregoing and other objects in view there is provided, in accordance with the invention, a device for measuring elevated areas of the surface of a rotary body constructed as a cylinder, a roller, a sleeve or a plate of a printing press, for example a flexographic printing plate mounted on a sleeve, including a first motor for rotating the rotary body about a rotational axis and a measuring unit, in which the measuring unit for the contactless measurement includes at least one radiation source and at least one area scan camera.

An area scan camera differs from a line scan camera in that not just a one-dimensional, light-sensitive line sensor is present, but a two-dimensional, light-sensitive area sensor is present, wherein the area sensor preferably includes a plurality of line sensors. The area scan camera can be composed of a number of, for example mutually adjacent, line scan cameras.

The area scan camera can be a plurality of area scan cameras disposed next to one another. The area scan camera can be disposed (with respect to a cylinder or a carrier cylinder or the axis thereof) so as to be stationary or movable, in the axial direction (preferably in a horizontal direction), and/or the area scan camera can be disposed so as to be stationary or movable, perpendicular to the axis (preferably in a vertical direction).

The use of an area scan camera makes it possible to measure very quickly and very precisely at the same time.

The device according to the invention allows contactless measurement and advantageously avoids potential damage to the object to be measured, in particular to delicate print dots of flexographic printing plates. The measurement using radiation, and in particular electromagnetic radiation, such as light, additionally enables very fine measuring, which is of advantage in particular when measuring fine print dots of flexographic printing plates.

During use, such a device allows the automatic measuring of, for example, a mounted printing plate or a mounted flexographic printing plate or of a printing sleeve or of a flexographic printing sleeve and, consequently, automatic presetting of the respective optimal working pressure between the cylinders and/or rollers involved in the printing process, such as an anilox roller, a printing cylinder including the printing plate, and an impression cylinder. An optimal working pressure yields a uniform print image. Presetting advantageously allows downtimes and start-up waste to be reduced, or even be avoided, for example when changing to another print job.

During use, such a device also makes it possible to dynamically set the optimal working pressure, the optimal print speed and/or the optimally adjusted dryer output as a function of the production speed. In this way, it is possible to produce high-quality print products in an industrial process (automated, using few staff, and inexpensively).

In the case of an absent data network and/or a large spatial distance of the prepress services (such as manufacture of flexographic printing plates) and print services (such as printing by way of a flexographic printing press), the local use of a device according to the invention can ensure that all values required for local, high-quality printing (such as the working pressure, the print speed and/or the dryer output) can be generated and provided quickly and precisely.

Refinements of the Invention

A preferred refinement of the invention can be distinguished in that the measuring unit for contactless measurement includes a reference object. The reference object can preferably be a taut wire (axially parallel to the rotary body). During measurement of the elevated areas of the surface, the reference object serves as a reference. The reference object, or at least the (axially parallel) contour thereof, can also be detected by the area scan camera. During the preferred use of multiple adjacent area scan cameras, the images of the individual cameras can advantageously be aligned with one another with the aid of the reference object or the respective depiction thereof (in the camera image). As a result, a high-precision and consequently time-consuming alignment of the camera is not necessary. Another advantage is that the use and simultaneous detection of a reference object can considerably reduce the data volume to be processed.

A preferred refinement of the invention can be distinguished in that a second motor is present, which allows the measuring unit to be adjusted perpendicularly to the rotational axis.

A preferred refinement of the invention can be distinguished in that the second motor adjusts (not just the measuring unit, but preferably also) the reference object perpendicularly to the rotational axis.

A preferred refinement of the invention can be distinguished in that a further second motor adjusts the reference object perpendicularly to the rotational axis. The further second motor is not the aforementioned second motor, that is, there are two separate second motors.

A preferred refinement of the invention can be distinguished in that the radiation source, and in particular the light source, irradiates, and in particular illuminates, at least one region of the surface.

A preferred refinement of the invention can be distinguished in that the reference object is static or stationary parallel to the rotational axis, in particular during the measurement. The reference object can be disposed in a stationary manner, for example, a wire can be clamped in a stationary manner at the two ends thereof.

A preferred refinement of the invention can be distinguished in that the reference object is a line-shaped object, which is tensioned parallel to the rotational axis, or an object including a blade, or a beam. The object including a blade can be a knife-like object. The blade or an edge of the beam serves as a reference line of the reference object.

A preferred refinement of the invention can be distinguished in that the reference object is a taut string or a taut wire or a taut carbon fiber. The use of a taut wire is preferred. This has been found to be a practicable and sufficiently precise technical solution in comprehensive analyses. Potential oscillations of the wire during the measurement can be compensated for computationally. In the case of a less preferred use of a knife or of a beam, it may be necessary to structurally compensate for thermal changes (expansions). The computational compensation, and thus the use of the wire, is preferred due to the low costs.

A preferred refinement of the invention can be distinguished in that a third motor is present, which moves the radiation source, and in particular the light source, and the camera parallel to the rotational axis. The radiation source, and in particular the light source, can form a structural unit together with the camera, and in particular can be integrated into the camera.

A preferred refinement of the invention can be distinguished in that the measuring unit includes at least one reflector. The reflector can extend across the axial length of the carrier cylinder. The reflector can be disposed in a stationary manner. The reflector can be a specular film or a film generating scattered light (white noise).

A preferred refinement of the invention can be distinguished in that the camera records at least one shared image, or an image sequence, or a shared film of an axial region of the contour of the rotary body, and of the same axial region of the reference object or of the contour thereof, in particular the contour thereof facing the contour of the rotary body. Another advantage is that the use and simultaneous detection of a reference object, and preferably of the contour thereof, can considerably reduce the data volume to be processed. A calculation, based on digital image processing, of the (radial) heights of the elevated areas of the printing form can utilize the (radial) distance, discernible in the image, between the elevated areas (or the contour thereof) and the reference object (or the contour thereof facing the same).

A preferred refinement of the invention can be distinguished in that a processor is present, which evaluates the image or an image sequence or the film and, in the process, determines the radial distance between individual elevated areas of the surface and the rotational axis. The image sequence or the film can include, for example, one image or up to 10 images or up to 100 images per 1 mm circumference of the rotary object. The resolution in the axial direction can be between 10,000 and 100,000 pixels, for example 1280 pixels times 30 cameras, that is, 38,400 pixels.

It may be provided that so-called AI is used. This AI may, for example, participate in the data evaluation of large data volumes (large surface to be measured and high resolution), for example during the determination of feed values for the impression setting on the DS and the OS, or carry this out alone. This may learn from data evaluations that were already carried out.

The features of the invention, the refinements of the invention and the exemplary embodiments of the invention also represent advantageous refinements of the invention when arbitrarily combined with one another. Refinements of the invention can furthermore include the individual features or feature combinations, disclosed in the above section "Field of the Invention."

The invention and the preferred refinements thereof will be described in greater detail hereafter with reference to the drawings based on preferred exemplary embodiments.

Although the invention is illustrated and described herein as embodied in a device for measuring elevated areas of the surface of a rotary body and a system having the device, it is nevertheless not intended to be limited to the details shown, since various modifications and structural changes may be made therein without departing from the spirit of the invention and within the scope and range of equivalents of the claims.

DETAILED DESCRIPTION OF THE INVENTION

Figure 1:
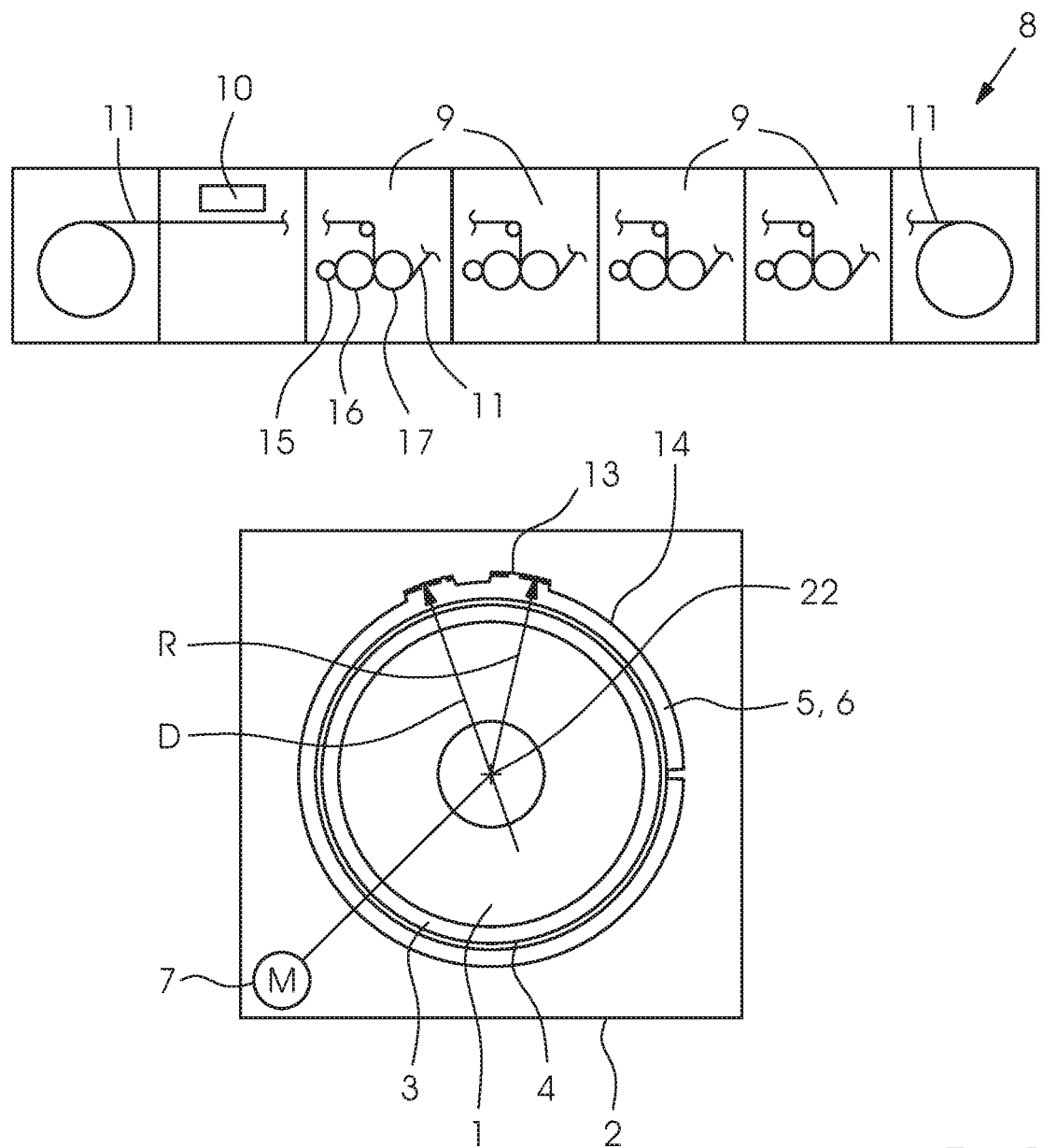
FIG. 1 includes a diagrammatic, cross-sectional view of a measuring station and a longitudinal-sectional view of a printing press.

Referring now in detail to the figures of the drawings, in which like features are denoted by like reference numerals, and first, particularly, to FIG. 1 thereof, there is seen a cross-section of a rotatable carrier cylinder 1 of a measuring station 2, a sleeve 3 accommodated on the carrier cylinder, and a printing plate 5, serving as the rotary body 6, which is accommodated on the sleeve, preferably attached to (referred to as "mounted on") the sleeve by way of adhesive tape 4 (or, alternatively, by way of an adhesive coating of the sleeve), and to be measured, at least with respect to the topography thereof. As an alternative, a preferably laser-engraved printing sleeve can be measured on the carrier cylinder.

A motor 7 can be present in the measuring station so as to rotate the carrier cylinder during the measurement. The measuring station can be part of a so-called "mounter" (in which printing plates are mounted on carrier sleeves), or can be provided separately from a mounter. The measuring station can be provided separately from a printing press 8 which includes at least one printing unit 9 for the printing plate 5 and a dryer 10 for printing and drying a preferably web-shaped print substrate 11. The printing press is preferably a flexographic printing press, and the printing plate is thus preferably a flexographic printing form, for example having a diameter of 106 mm to 340 mm. The dryer is preferably a hot air dryer and/or a UV dryer and/or an electron beam dryer and/or an IR dryer. The sleeve can be pushed laterally onto the carrier cylinder. The carrier cylinder can have openings in the lateral surface thereof, out of which compressed air can be ejected, so as to widen the sleeve and generate an air cushion when pushing on the sleeve. The sleeve, together with the printing plate, can be removed from the measuring unit after measurement, and can be pushed onto a printing cylinder of the printing unit in the printing press. As an alternative to the pneumatic clamping system, it is also possible to use a hydraulic clamping system.

The measuring station 2 can be calibrated by using measuring rings 12 on the carrier cylinder 1. As an alternative, a measuring sleeve or the carrier cylinder itself can be used for calibration.

Figure 2A:
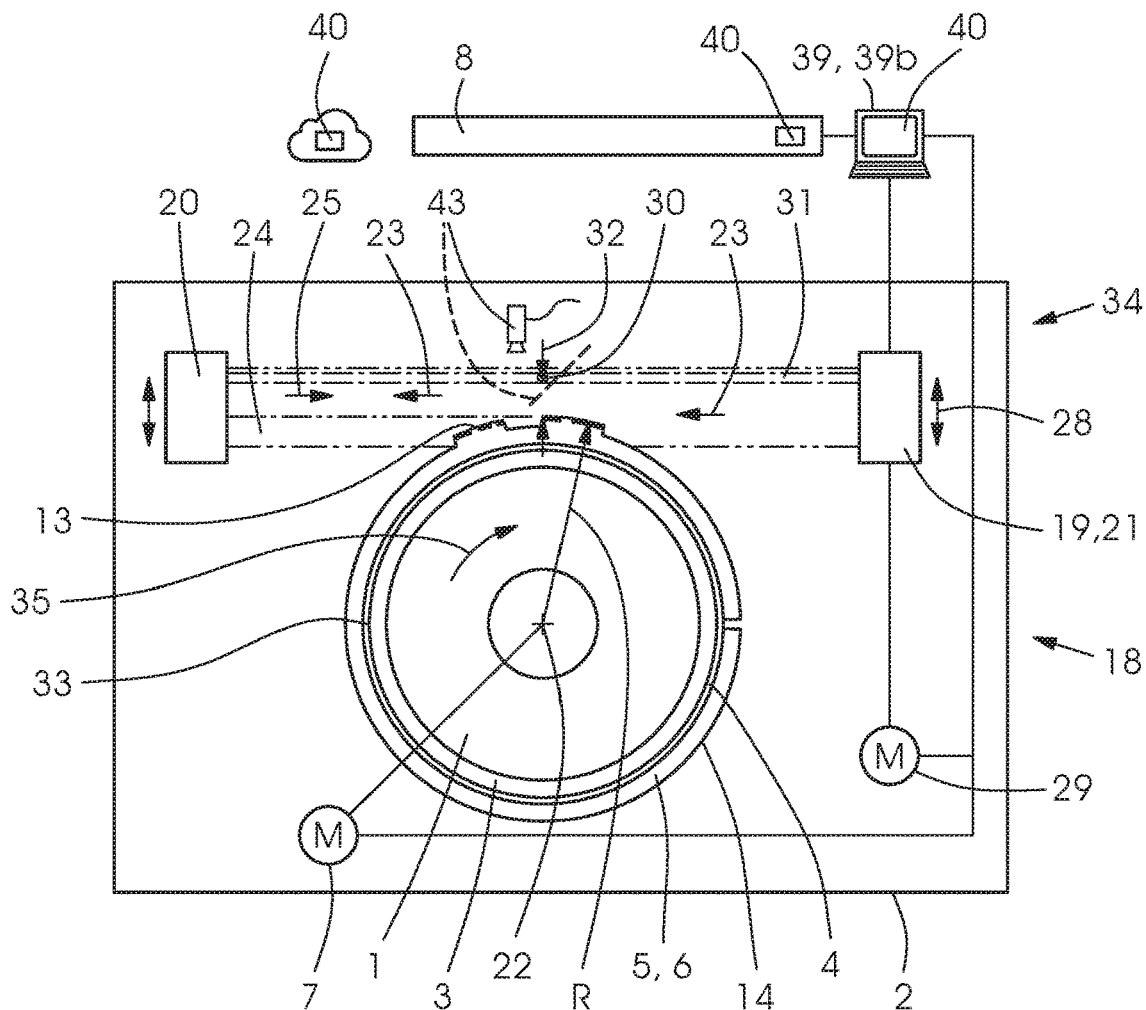
FIGS. 2A, 2B and 2C are respective cross-sectional, top-plan and enlarged, fragmentary, cross-sectional views of a device for measuring the topography of a printing plate.
Figure 2C:
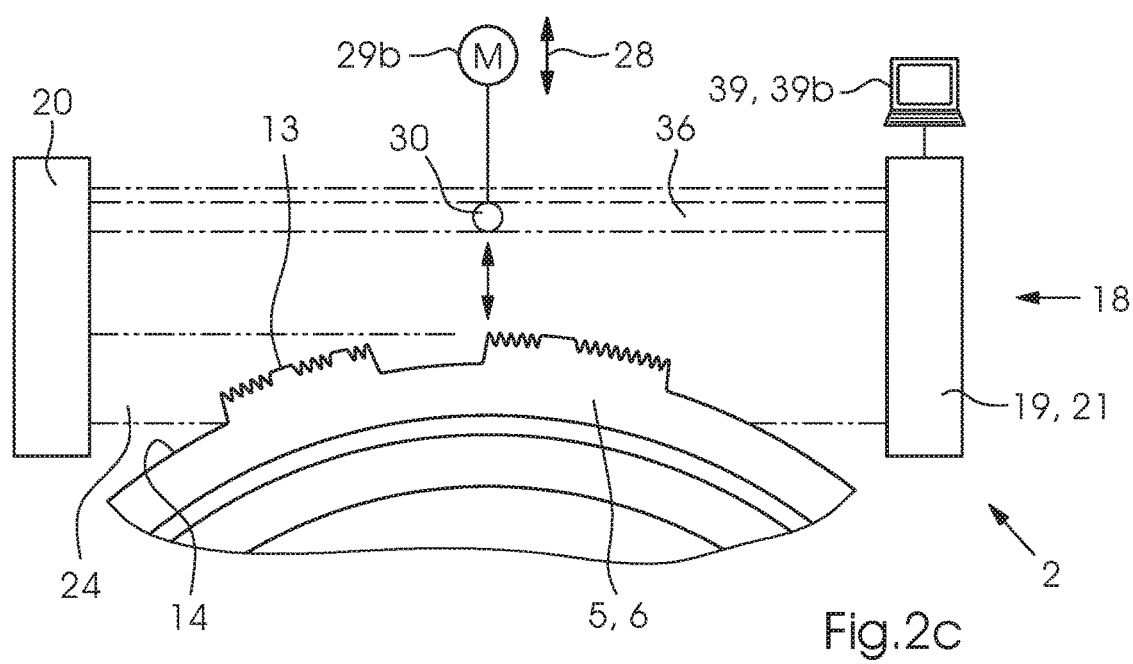

The following figures show preferred embodiments of devices according to the invention for the contactless measuring of elevated areas 13 of a surface 14 of a rotary body 6 constructed as a cylinder, a roller, a sleeve or a plate of the printing press 8 (see FIG. 2C). The elevated areas can be flexographic print dots (in the grid) or flexographic print areas (in the full surface area) of a flexographic printing plate, for example. The following exemplary embodiments describe the measurement of a printing plate 5 by way of example. By measuring the printing plate, automatic presetting of a respective optimal working pressure between the cylinders involved in the printing process, for example an anilox cylinder 15, a printing cylinder 16 including the printing plate 5, and an impression cylinder 17, is made possible.

Figure 2B:
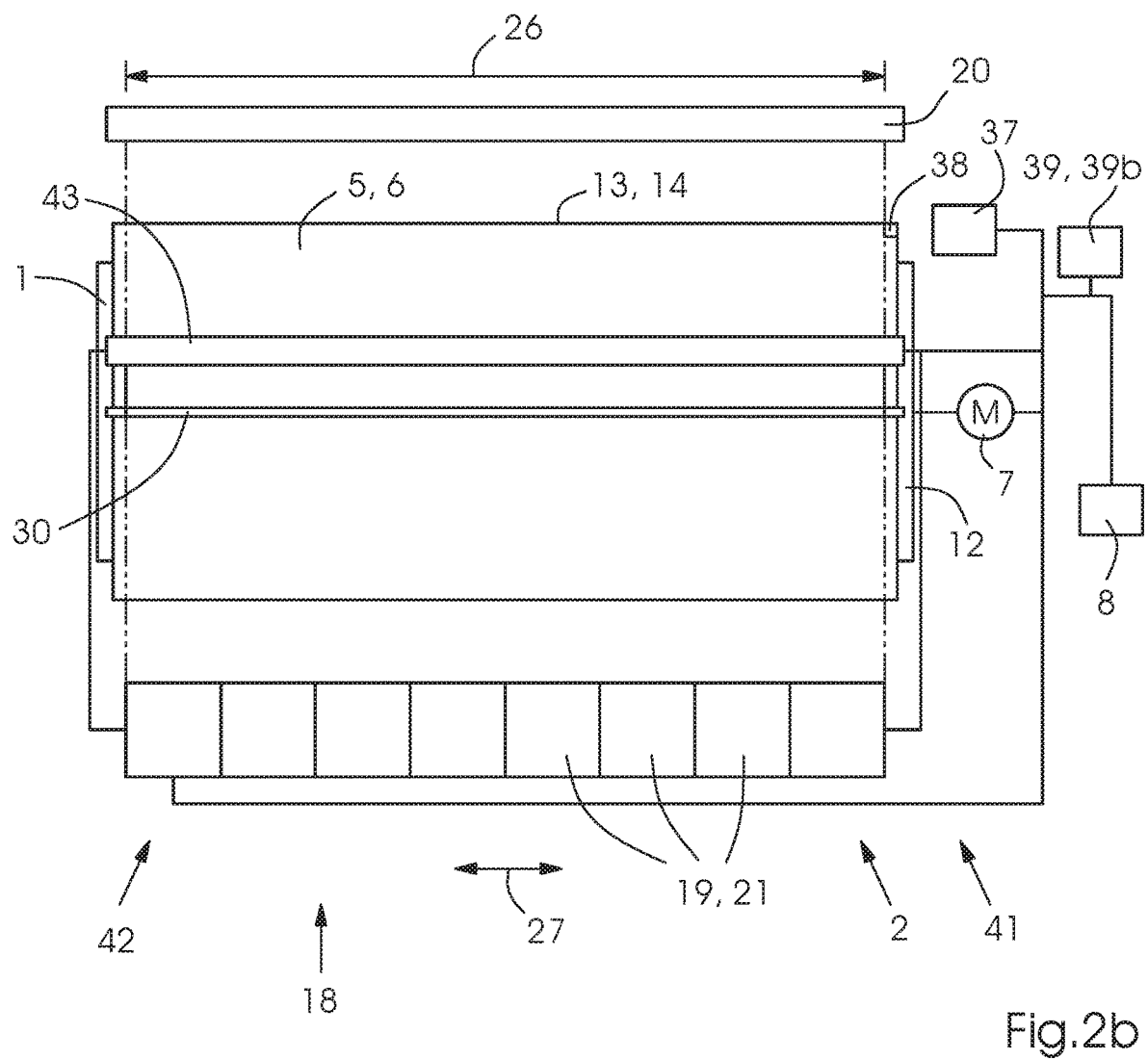

FIGS. 2A to 2C show a preferred embodiment of the device according to the invention for measuring the topography of a printing plate 5, in which FIG. 2A shows a cross-section, FIG. 2B a top view, and FIG. 2C an enlarged section of FIG. 2A. According to this embodiment, the topography is preferably detected by way of multiple units 18 within the scope of a 3D radius ascertainment using an optional reference line.

In this and the following embodiments, "2D" shall be understood to mean that a section of the printing plate 5 (for example, annular height profile) is scanned, and "3D" shall be understood to mean that the entire printing plate 5 (for example, cylindrical height profile, composed of annular height profiles) is scanned.

The device includes a plurality of radiation sources 19, in particular light sources 19, preferably LED light sources, at least one reflector 20 and at least one light receiver 21, preferably an area scan camera, and particularly preferably a high-speed camera. Hereafter, the radiation sources are assumed to be light sources by way of example, that is, visible light is emitted. As an alternative, the radiation source can emit different electromagnetic radiation, such as infrared. The light sources are preferably disposed in a row perpendicularly to a rotational axis 22 of the carrier cylinder 1 and create a light curtain 23, wherein the carrier cylinder 1 together with the sleeve 3 and the printing plate 5, that is, the contour, create a shadow 24. The reflected and then received light 25, that is, basically the emitted light 23 without the light 24 shadowed by the topography 13, carries information regarding the topography 13 to be measured. The reflector 20 can be constructed as a reflective film.

The light source 19 is area-shaped (area scan camera). The light source preferably emits visible light. The light sources 19 and the light receivers 21 preferably cover a working width 26, that is, the extension of the printing plate 5 in the direction of the axis 22 thereof (for example, 1650 mm). Preferably, n light sources 19 and light receivers 21 can be provided, wherein, for example, 2>n>69. When using cameras having a smaller size, a higher upper limit than 69 may be necessary. If the entire working width 26 is covered, the printing plate 5 can be measured during one revolution of the carrier cylinder 1. Otherwise, the light sources and light receivers have to be moved or cycled in the axial direction 27 along the printing plate.

Preferably, inexpensive, but rapidly operating cameras 21 are used, for example, black and white cameras. The cameras can record individual images or a film during the rotation of the printing plate 5.

The unit including the light sources 19, reflector 20 and light receiver 21 can preferably be moved in a direction 28 perpendicular to the axis 22 of the carrier cylinder 1 so as to direct a generated strip of light 23 onto the topography 13 to be measured. A motor 29 can be present for this purpose. It can also be provided that the reflector is constructed to be stationary and that only the light source and/or the light receiver are moved, for example, displaced by way of the motor.

In contrast to the representation, the topography 13 is preferably measured in the vertical direction (for example, camera "at the bottom" and reflector "at the top"), and not in the horizontal direction, since in this case a possible deflection of the carrier cylinder 1 and of the reference object 30 can remain without consideration. In this preferred embodiment, FIG. 2A should be imagined rotated by 90° clockwise.

A line-shaped object 30, preferably a taut thread 30 or a taut string 30, for example a metal wire or a carbon fiber, or a blade (or a knife-like object or an object including a blade), or a beam, is provided as the optional reference object 30, which generates a reference line 31 for the plurality of light receivers 21. The line-shaped object preferably extends parallel to the axis of the carrier cylinder 1 and is disposed at a small distance 32, for example 2 mm to 10 mm (no more than 20 mm), from the lateral surface 33 thereof or the printing plate 5 disposed thereon. The received light 25 also includes information regarding the reference object 30 which can be evaluated, for example the location thereof and/or the distance thereof with respect to the surface 14 of the printing plate 5 (which is preferably etched and thus lower than the elevated areas 13). Through the use of the reference line, it is possible to determine the radial distance R between the topography 13 or the contour or the elevated contour areas and the reference object 30, preferably by using digital image processing. The distance between the reference object 30 and the axis 22 of the carrier cylinder 1 is known from the configuration and/or motor-based adjustment of the reference object 30 (optionally together with the light source 19 and the light receiver 21, and optionally the reflector 20). In this way, the radial distance of the elevated contour areas, that is, the radius R of the print dots, can be computationally determined. Due to the use of the reference object 30, and thus the presence of a shadow caused thereby, or of a reference line 31 corresponding to the shadow (in the recorded image or from the received light) of each camera 21, an exact alignment, for example with pixel precision, of the cameras with respect to one another is not absolutely necessary. Furthermore, the reference object 30 can be used to calibrate the measuring system.

The reference object 30 can be coupled to the light source 19 and/or the motor 29 for movement or adjustment in the direction 28. As an alternative, the reference object can include a dedicated motor 29b for the movement/adjustment.

A measurement using the ("empty") carrier cylinder or a measuring sleeve disposed thereon is preferably carried out (measurement of distance between reference object and surface from DS to OS) for the initial referencing of the device.

The area scan camera 21 is preferably first moved in the direction 28 toward the carrier cylinder 1 for the further initialization of the device prior to the measuring process. The movement is preferably stopped as soon as the camera preferably detects the first elevated area. Afterwards, the reference object 30 is preferably moved, likewise in the direction 28, toward the carrier cylinder 1, up to a predefined distance, for example 2 mm.

As an alternative, the light source 19 and the light receiver 21 can also be disposed on opposing sides of the carrier cylinder 1. In this case, the reflector 20 can be dispensed with.

The light source 19, the reflector 20 (if present according to the embodiment), the light receiver 21 and the optional reference object 30 preferably form a unit 34 that can be moved (perpendicularly to the axis 22 of the carrier cylinder), and in particular can be adjusted or displaced by way of the motor.

During the measurement, the carrier cylinder 1 rotates together with the printing plate 5 situated thereon, so that preferably all elevated areas 13 in the circumferential direction 35 can be detected. From this, as a function of the angular position of the carrier cylinder 1, it is possible to ascertain a topography image and the radius R of individual elevated areas 13, for example flexographic print dots, with respect to the axis 22 or the diameter D (measured between opposing elevated areas).

In the enlarged representation of FIG. 2C, a section of the topography 13 of the printing plate 5 is shown, and the shadow 24 of the topography and the shadow 36 of the reference object 30 are apparent. The elevated areas 13 of the topography can be in the range of 2 μm to 20 mm.

Moreover, a sensor 37 can be provided, which detects the sleeve 3 and/or the printing plate 5 based on an identifying feature 38 (see FIG. 2B). This feature can, for example, be a bar code, a 2D code (for example, a QR code or a data matrix code), an RFID chip, or an NFC chip.

The signals and/or data generated by the light receivers 21 including information regarding the topography 13 of the surface 14 to be measured and regarding the reference object 30, are transmitted to a processor 39, preferably through a line or a wireless connection, and are further processed there. The processor is connected to the printing press 8. The processor 39 evaluates the information.

The result of the evaluation is stored in a digital memory 40 of the processor, in a memory 40 of the printing press or in a cloud-based memory. The results are preferably stored in a manner associated with the particular identifying feature 38. During the later use of the printing plate 5 mounted on a sleeve (or of the printing sleeve/flexographic printing plate) in the printing press 8, the identifying feature 38 of the printing plate 5 (or of the printing sleeve/flexographic printing plate) can be read in again. The values stored for the identifying feature 38 can then be retrieved, for example for the purpose of presetting. It may be provided, for example, that the printing press receives data required for a print job from the cloud-based memory.

The result of the evaluation can preferably include up to four values: the engagement settings of the printing cylinder 16, that is, of the cylinder carrying the measured printing plate 5 on the two sides 41, or DS (drive side), and 42, or OS (operating side), against the impression cylinder 17 or the print substrate transport cylinder 17, which are required for operation, and the engagement settings of an anilox roller 15 inking the measured printing plate 5 on the two sides 41, or DS (drive side), and 42, or OS (operating side), against the printing cylinder 16, which are required for operation.

Furthermore, a unit 43 for detecting the dot density, for example by way of optical scanning, can be provided, preferably a laser triangulation unit, a contact image sensor (CIS) scanner strip or a line scan camera. As an alternative, the unit 43 can be a pivotable or movable mirror, so as to be usable together with the light sources 19, 21 for measuring the dot density. The unit is preferably connected to a unit for image processing and/or image evaluation, which is preferably the processor 39, or the processor 39 having corresponding programming, or which can be a further processor 39*b*.

A CIS scanner strip can be disposed axially parallel to the cylinder. This preferably includes LEDs for illumination, and sensors for image acquisition (similarly to a scanner strip of a commercially available copier). The strip is preferably disposed at a distance of 1 to 2 cm from the surface or is positioned at this distance. The cylinder including the surface to be measured, for example the printing plate, rotates beneath the strip, which generates an image of the surface in the process, and provides image evaluation for a dot density evaluation. The data obtained from the detection of the dot density can also be used, for example, to computationally select or recommend an anilox roller, which is optimal for printing with the detected printing form, from a plurality of available anilox rollers.

Figure 3A:
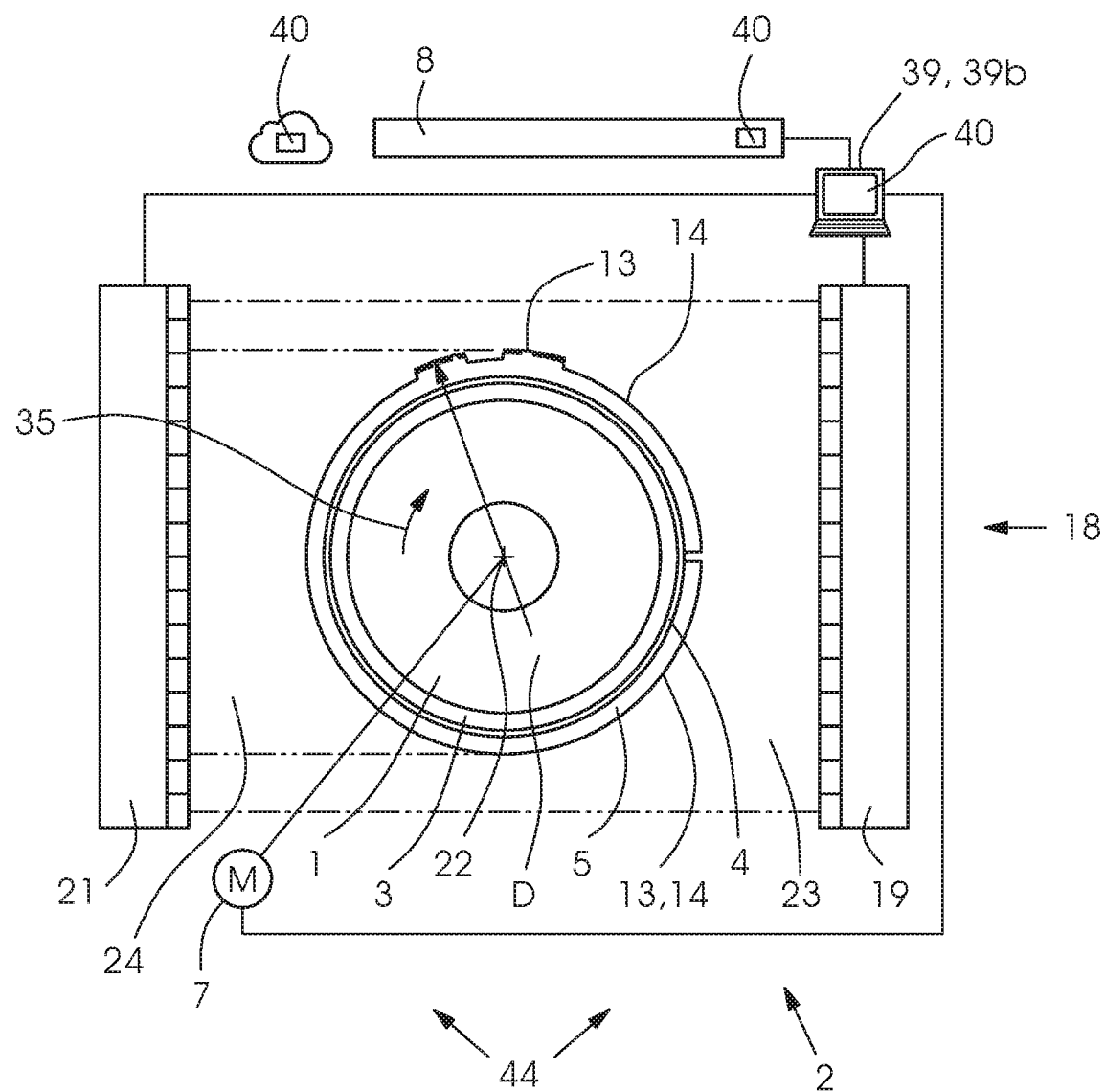
FIGS. 3A and 3B are respective cross-sectional and top-plan views of another embodiment a device for measuring the topography of a printing plate.
Figure 3B:
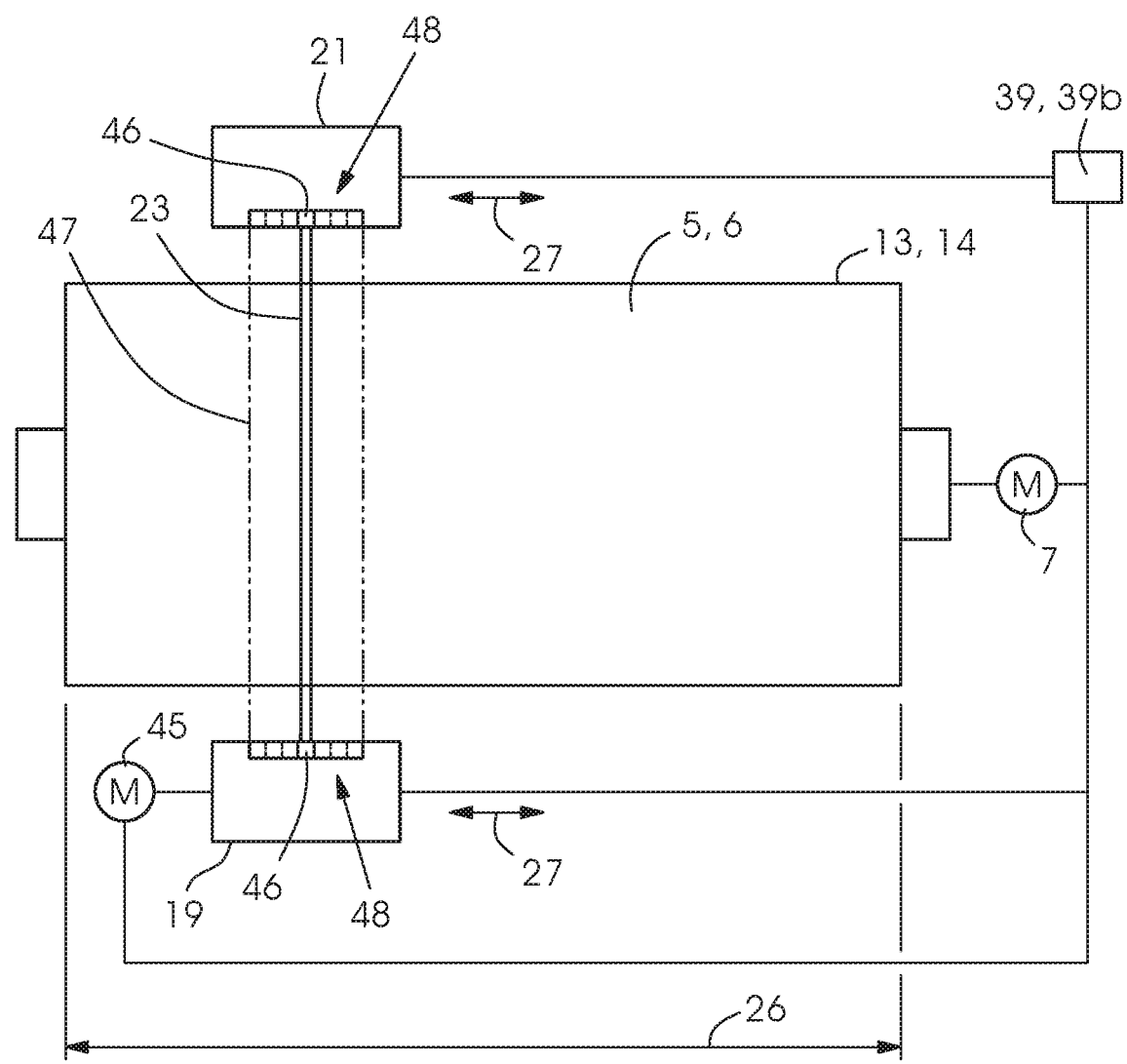

FIGS. 3A and 3B show a preferred embodiment of the device according to the invention for measuring the topography of a printing plate 5, with FIG. 3A showing a cross-section, and FIG. 3B a top view. According to this embodiment, the topography is preferably detected by way of a laser micrometer 44 within the scope of a 2D diameter ascertainment.

The device includes a light source 19, preferably a line-shaped LED light source 19 or a line-shaped laser 19, and a light receiver 21, preferably a line scan camera 21. The laser and the light receiver together form a laser micrometer 44. The light source 19 generates a light curtain 23, and the carrier cylinder 1 including the sleeve 3 and the printing plate 5 generates a shadow 24. The line lengths of the light source 19 and of the light receivers 21 are preferably greater the diameter D of the carrier cylinder, including the sleeve and the printing plate, so as to enable the topography without moving the unit 44 perpendicularly to the axis 22 of the carrier cylinder. In other words, the cross-section of the carrier cylinder is completely situated in the light curtain.

The unit 44 including the light source 19 and the light receiver 21 can be moved parallel to the axis 22 of the carrier cylinder (in the direction 27) so as to detect the entire working width 26. A motor 45 can be present for this purpose.

A sensor 37 can be provided, which detects the sleeve 3 and/or the printing plate 5 based on an identifying feature 38 (see FIG. 2B).

The signals and/or data generated by the light receivers 21 are transmitted to a processor 39, preferably through a line or a wireless connection, and are further processed there. The processor is connected to the printing press 8.

As an alternative, the light source 19 and light receiver 21 can also be disposed on the same side of the carrier cylinder 1. In this case, a reflector 20 is disposed opposite thereto, similarly to FIGS. 2A to 2C.

According to an alternative embodiment, the topography is preferably detected by way of a laser micrometer 44 within the scope of a 2D diameter ascertainment, wherein not only a single measuring line 46, but a wider measuring strip 47 (shown with dotted lines) composed of multiple measuring lines 48 (shown with dotted lines) is detected. In this exemplary embodiment, the light source 19 and the light receiver 21 preferably have an areal configuration, and are not merely constructed in a line-shaped manner. The light source 19 can include multiple light lines 48, each having a width of approximately 0.1 mm and a distance of approximately 5 mm from one another. The camera is preferably constructed as an area scan camera in this example.

Figure 4A:
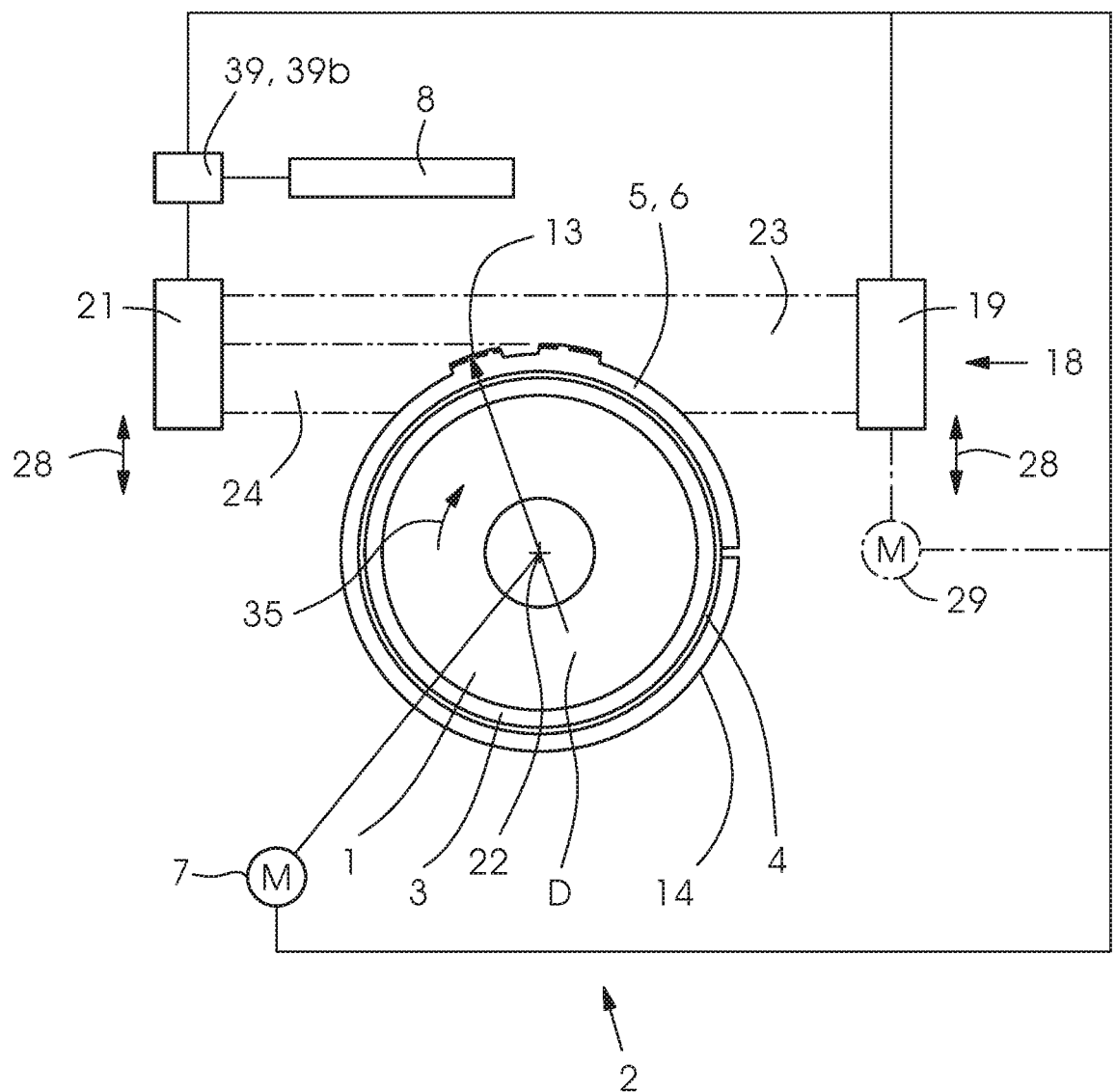
FIGS. 4A and 4B are respective cross-sectional and top-plan views of a further embodiment a device for measuring the topography of a printing plate.
Figure 4B:
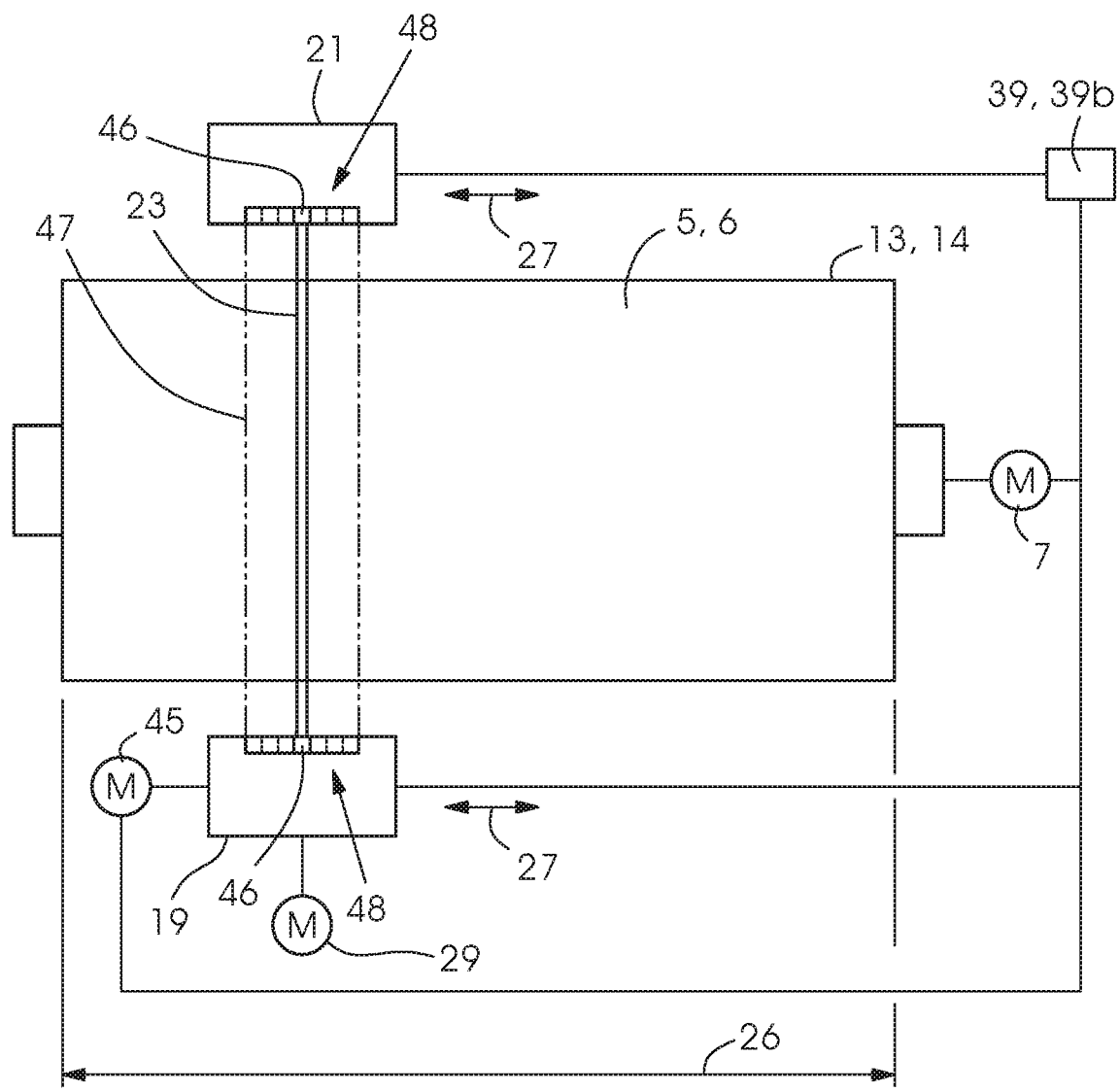

FIGS. 4A and 4B show a preferred embodiment of the device according to the invention for measuring the topography of a printing plate 5, with FIG. 4A showing a cross-section, and FIG. 4B a top view. According to this embodiment, the topography is preferably detected by way of a laser micrometer within the scope of a 2D radius ascertainment.

The device includes a light source 19, preferably an LED light source 19, and a light receiver 21, preferably a line-shaped LED light source 21 or a line-shaped laser 21. The light source 19 generates a light curtain 23, and the carrier cylinder 1 including the sleeve 3 and the printing plate 5 generates a shadow 24.

The unit including the light source 19 and the light receiver 21 can preferably be moved in a direction 28 perpendicular to the axis 22 of the carrier cylinder 1 so as to direct the light curtain 23 onto the topography 13 to be measured. A motor 29 can be present for this purpose. If the light curtain 23 is wide enough and thus covers the measuring area, the motor 29 can be dispensed with.

The signals and/or data generated by the light receivers 21 are transmitted to a processor 39, preferably through a line or a wireless connection, and are further processed there. The processor is connected to the printing press 8.

As an alternative, the light source 19 and light receiver 21 can also be disposed on the same side of the carrier cylinder. In this case, a reflector 20 is disposed opposite thereto, similarly to FIGS. 2A to 2C.

According to an alternative embodiment, the topography 13 is preferably detected by way of a laser micrometer 44 within the scope of a 3D radius ascertainment, wherein not only a measuring line 46, but a wider measuring strip 47 (shown with dotted lines), that is, multiple measuring lines 48 at a time, is detected. In this exemplary embodiment, the light source 19 and the light receiver 21 have an areal configuration, and are not merely constructed in a line-shaped manner.

According to a further alternative embodiment, the topography 13 is preferably detected by way of a laser micrometer 44 within the scope of a 3D radius ascertainment, wherein the unit including the light source 19 and the light receiver 21 can preferably be moved in a direction 28 perpendicular to the axis of the carrier cylinder 1 so as to direct the light curtain 23 onto the topography 13 to be measured. A motor 29 (shown with dotted lines) can be present for this purpose.

According to an alternative embodiment, the topography 13 is preferably detected by way of a laser micrometer 44 within the scope of a 3D radius ascertainment, wherein the two latter alternative embodiments are combined.

Figure 5:
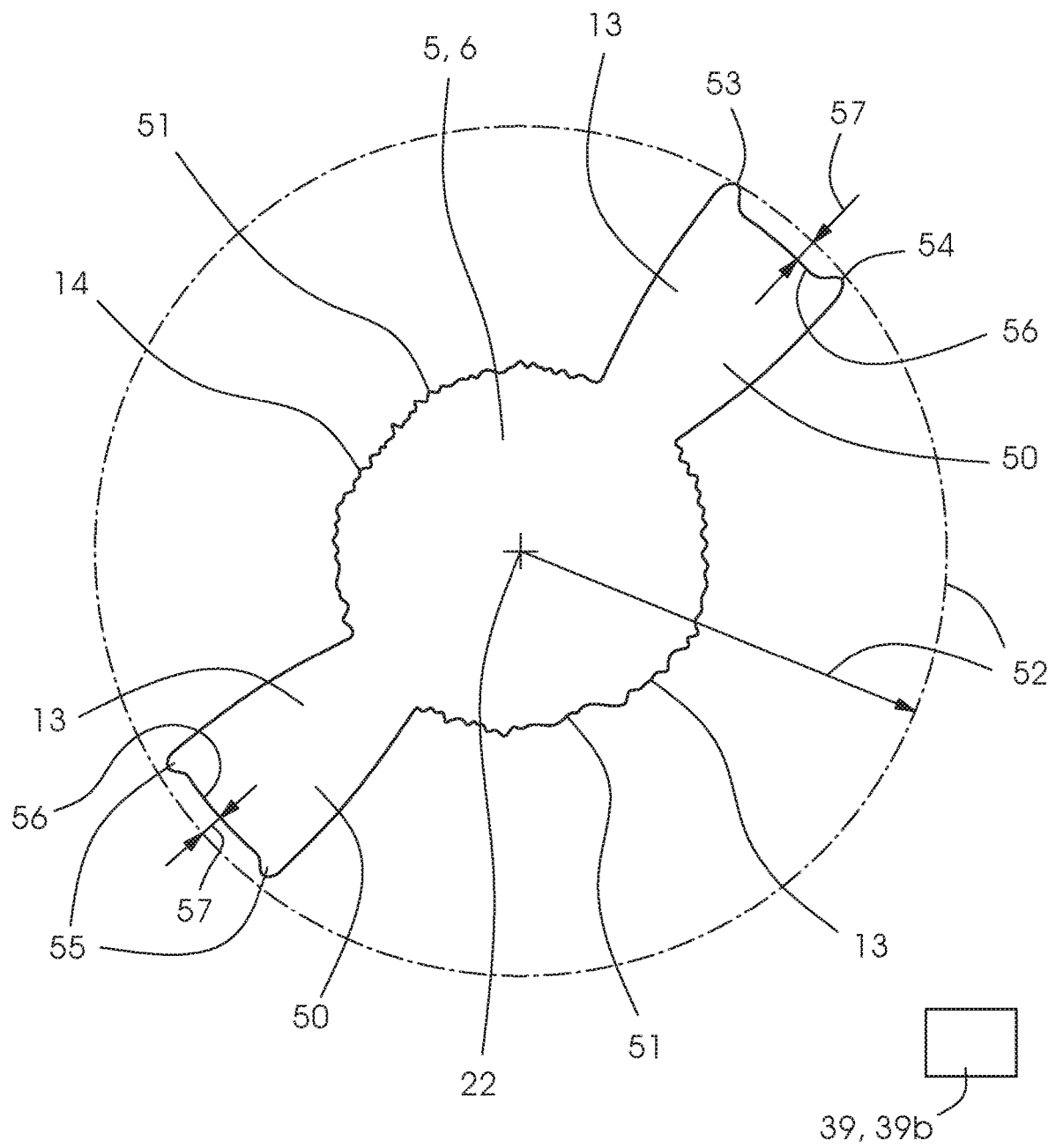
FIG. 5 is an exemplary and greatly enlarged topography measurement result of a printing plate.

FIG. 5 shows an exemplary and greatly enlarged topography measurement result of a printing plate 5 including two printing regions 50 and two non-printing regions 51. The radial measurement results for 360° at an axial location (with respect to the axis of the carrier cylinder) are shown. The non-printing regions can have been created by etching, for example, and can thus have a smaller radius than the printing regions.

The illustration also shows an enveloping radius 52 or an envelope 52 of those points of the printing plate 5 which have the largest radius, that is, the highest elevated areas of the topography 13 at the axial locations.

A dot 53 of the printing plate 5 is a printing dot since, during printing operation with normally set impression or engagement between the printing plate 5 and the print substrate 11 or the transport cylinder 17, it would have sufficient contact with the print substrate and with the ink-transferring anilox roller. Normally set impression creates a so-called kiss print, in which the printing plate barely touches the print substrate and in which the flexographic print dots are not substantially squeezed.

A dot 54 is a dot that would just barely still print during printing operation with normally set impression, since it would barely still have contact with the print substrate.

Two dots 55 are dots that would not print, since these would have no contact with the print substrate, and also no contact with the anilox roller, during printing operation with normally set impression.

A computer program runs on the processor 39, which computationally, such as through the use of digital image processing, ascertains the radially lowest dot 56 in the printing region 50, and the radial distance 57 thereof with respect to the envelope 52, during printing operation. This calculation is carried out in the axial direction at regular intervals, for example from the DS to the OS at all measuring points, and the respective maximum of the lowest points (that is, the maximally lowest value) from the DS to the center and from the center to the OS is determined. The two maxima, or feed values or settings values computationally determined therefrom, can be selected, for example, as the respective feed/setting on the DS and the OS during printing, that is, the cylinder spacing between the cylinders involved in printing is reduced by the feed on the DS and the OS. For this purpose, a respective motor-driven threaded spindle can be used on the DS and the OS.

A specific numerical example is provided hereafter:

A distance deltaR=65 µm results on one side, and a distance delta R=55 µm results on the other side. 65 µm has to be fed for all dots 53 to 55 of the printing plate to print.

In all illustrated embodiments and the described alternatives thereof, the manufacturing-related and/or operation-related (caused by wear) concentricity accuracy of the sleeve 3 can additionally be measured and, based on the measurement and evaluation results, can be taken into consideration during printing so as to improve the quality of the generated print products. A warning may be issued when a predefined concentricity tolerance is exceeded. The measurement can be carried out for smooth and for porous sleeves.

In all illustrated embodiments and the described alternatives thereof, manufacturing-related thickness fluctuations of the printing plate 5, in particular of the polymer material thereof, and/or the distortions thereof, in particular due to the mounting on the sleeve, and/or dust and/or hair or air inclusions (between the sleeve and the mounted printing plate) and/or the elevated areas present due to adhesive surfaces 4 and/or the influence of the temperature (thermal expansion) may additionally be measured. Dust particles and the positions thereof can be individually determined by the topography detection. Individual dust particles can be displayed to the user, for example, by way of a projected laser spot/a projected laser crosshair on the printing plate 5, for removal. As an alternative, a dust removal unit can be moved to the position of the dust particle, and the dust particle can be removed, for example, by way of an air blast or using a roll.

Instead of light sources 19 or light emitters 19 (which emit visible light), it is also possible within the scope of the invention to use radar emitters 19 (together with accordingly adapted receivers).

In all illustrated embodiments and the described alternatives thereof, it is also possible to ascertain parameters for a dynamic engagement pressure and to transfer these to the printing press. For example, a known (for example, previously measured) and provided to the processor 39, delayed expansion of the deformable and/or compressible dots 53 to 55 made of polymer material can be taken into consideration. Or, it is possible to use a hardness of the printing plate that was ascertained in advance using a durometer. This expansion can depend, in particular, on the prevailing print speed as a function of the operation, or this print speed dependence can be taken into consideration. At higher print speeds, for example, a higher engagement pressure can be selected.

It is also possible to take the print surface of the printing plate 5 or the dot density, that is, the locally variable density of the print dots on the printing plate 5, into consideration (as an alternative or in addition to the print speed): For example, at higher dot densities, a higher engagement pressure can be selected, and/or the dot density can be used when setting the dynamic engagement pressure. For this purpose, a unit 43 for detecting or measuring the dot density, that is, the local values thereof, on the printing form, such as the flexographic printing plate, can be provided, preferably a CIS scanner strip or a line scan camera. It can be provided, for example, to provide specified values for a different engagement pressure on the DS (drive side of the printing press) and the OS (operating side of the printing press), based on the data obtained/calculated from the dot density ascertainment.

Having knowledge of the dot density of the printing plate 5 and/or the inking anilox roller 15 and/or the sleeve 15, the ink consumption to be expected during printing using the printing plate on a given print substrate 11 can be computationally ascertained. From the ink consumption, it is possible to computationally ascertain the required output of the dryer 10 for drying the ink on the print substrate. Proceeding from the calculated ink consumption to be expected, it is also possible to calculate an ink supply to be provided.

In all illustrated embodiments and the described alternatives thereof, it is also possible to take a so-called cylinder or plate bounce pattern into consideration. A bounce pattern is a disturbance that occurs periodically during the rotation of the printing plate 5 during operation, which is caused by a page-width, usually extending in the axial direction, or at least by a disruptively wide gap or score line in the printed image, that is, a disruptively large region having no print dot, or another axial groove. Such grooves or the bounce pattern caused thereby can impair the print quality since the cylinders involved in printing, due to the kiss-print contact, approach and repel one another in the recurring region of the groove during rotation, which is thus a rhythmic process. In unfavorable cases, this can result in undesirable thickness fluctuations or even missing print. An existing bounce pattern can preferably be detected by way of a CIS measuring unit 43 (for example, the aforementioned pivotable or movable mirrors, together with the area scan cameras) or by way of an area scan camera, and can be computationally evaluated and compensated for in the impression setting required during operation. For example, based on the detected bounce pattern, it is possible to calculate in advance at what speeds or rotational speeds of a printing press vibrations would occur. These speeds or rotational speeds are then not used during production and, for example, are passed over during start-up of the press.

Each printing plate 5 can have an individual bounce pattern. Grooves in the printing form can negatively impact the print result, or even result in missing print. So as to mitigate, or even eliminate, cylinder or plate bounce, the printing plate is examined for grooves in the unwinding direction. At known resonant frequencies of the printing unit 9, it is possible to calculate production speeds that are particularly unfavorable for a given printing form. These print speeds are to be avoided (referred to as "no go speed").

In all illustrated embodiments and the described alternatives thereof, it is also possible to detect register marks (or multiple register marks, such as wedges, double wedges, dots or crosshairs) on the printing form, for example using the camera 21 or 43, and downstream digital image processing, and to measure, store and keep available the positions thereof. In this way, automatic setting of register control systems or the register sensors thereof to the register marks or to axial positions is made possible. In this way, errors caused by the otherwise customary manual setting of the sensors can advantageously be avoided. As an alternative, it is possible to detect patterns and use these to configure a register control system. It can also be provided to automatically position a register sensor movable by way of a motor, in particular in the axial direction. It can also be provided to compare a predefined zero point of the angular position of a printing cylinder and/or of a sleeve disposed thereon to an angular value of the actual location of a print image (glued on manually, for example), in particular in the circumferential direction (for example, of the cylinder/the sleeve). This comparison can yield an optimal starting value for the angular setting of the cylinder/of the sleeve. In this way, the print production can be started with a reduced register deviation. The same applies to the lateral direction (for example, of the cylinder/of the sleeve).

In all illustrated embodiments and the described alternatives thereof, it is also possible to control or regulate the output of the dryer 10 of the printing press 8. For example, LED dryer segments can be shut off in regions in which no printing ink was transferred to the print substrate, whereby advantageous energy savings and an extended service life of the LEDs are made possible.

More advantageously, the output of the dryer 10 or the output of individual segments of the dryer can be reduced for print regions on the printing plate having a low dot density. In this way, energy can be saved and/or the service life of the dryer or of individual segments can be extended. The shut-off or reduction can take place regionally, on one hand, and in a direction parallel and/or transversely to the axial direction of a printing plate, or to the lateral direction of the print substrate to be processed thereby, on the other hand. For example, it is possible to shut off segments or modules of a dryer in regions that correspond to nips between printing plates (that are, for example, disposed at a distance from one another, and in particular glued on manually).

In all illustrated embodiments and the described alternatives thereof, it is also possible to detect the respective location (on the printing plate 5) of measuring fields for print inspection systems, and to provide this for further use, for example, for setting the location of the print inspection systems.

In all illustrated embodiments and the described alternatives thereof, it is also possible to position an inline color measuring system. In order to determine the location, and thus the position, of the inline color measurement, image and/or pattern recognition is carried out, based on which the axial position for the measuring system is determined. In order to enable a free area for the calibration on the print substrate, free print areas can be shared with the inline color measuring system.

An exemplary overall process is to be described hereafter, which can be carried out by using the device according to the invention in a suitable embodiment.

Measuring Process:

Step 1: The sleeve 3, with or without the printing plate 5, is pushed onto the carrier cylinder 1 (to which air is applied) of the measuring station 2 using the air cushion and is locked.

Step 2: The sleeve is identified using a unique character string 38. This can take place using a bar code, a 2D code (for example, a QR code or a data matrix code), an RFID code or NFC.

Step 3: The camera 21, and optionally the reference object 30, are positioned according to the diameter (of the sleeve, with or without the printing plate).

Step 4: The topography 13 of the printing plate is ascertained, with a reference point to the axis 6 or to the axis center of the carrier cylinder 22, that is, the radii of the elevated areas/print dots 53 to 55. The light source 19 and the camera 21 of the measuring unit 18 move axially in the process, if necessary, and the carrier cylinder rotates (the angular position thereof is known by way of an encoder).

Step 5: An area scan is carried out to identify dot densities, free print areas, printing area, register marks and/or measuring fields for the inline color measurement.

Step 6: A topography algorithm running on a processor 39 is applied, and the areas are evaluated by way of the area scan, with recognition of bounce patterns and with register mark field configuration or inline color measurement.

Step 7: Optionally, the plate hardness is ascertained (using a Shore hardness unit).

Step 8: A dust detector and/or a hair detector is employed.

Step 9: The data of the measurement results is stored in a digital memory 40.

Step 10: The measurement results are displayed, referencing dust/hairs or trapped air bubbles and/or displaying limit values, for example of concentricity, eccentricity and/or convexity.

Step 11: The measurement is potentially repeated, or the printing sleeve is removed so as to measure a further sleeve.

Set-Up Process:

Step 1: The sleeve 3, including the printing plate 5, is pushed onto the printing cylinder 16 (to which air is applied) of the printing press 8 using the air cushion and is locked.

Step 2: The sleeve is identified by the particular printing unit 9, or a sensor located there, using the unique character string 38 thereof. This can take place using a bar code, a 2D code (for example, a QR code or a data matrix code), an RFID code or NFC.

Step 3: The printing unit or printing press obtains the stored data for the associated identified printing sleeve/printing plate.

Setting Process:

Step 1: Feeding the so-called "kiss prints" (setting of the impression or of the operating pressure) for the printing cylinder 16 and the anilox cylinder 15, for example based on topography, concentricity and print substrate data for an optimal print dot. The diameter or radius is ascertained. The diameter or radius is known from the measurement.

Step 2: Calculating the preregister based on register mark data on the printing plate or sleeve reference point.

Step 3: Setting the dynamic engagement pressure based on ascertained dot density values and printed area and speed, and optionally the print substrate. Optionally, the plate hardness is taken into consideration (using the Shore hardness unit).

Step 4: Setting the optimal material web speed, for example based on the calculation of ascertained resonant frequencies of the printing unit to the printing plate by way of bounce pattern recognition.

Step 5: Setting the optimal dryer output (UV or hot air) based on dot density values and the printed area, and dynamically adapting the anilox cylinder data (pick-up volume, etc.) to the web speed.

Step 6: Calculating the ink consumption based on dot density values and the printed area, as well as anilox cylinder data (pick-up volume, etc.).

Step 7: Reducing or shutting of LED UV dryer sections in areas where the dot density on the printing plate is low or where no drying is needed, so as to save energy and increase the service life of the LED lamps.

Step 8: Fully automatically setting the register control system based on the obtained register mark data, such as mark configuration and automatic, axial positioning of the register sensor.

Step 9: Setting the measuring position for the spectral inline measurement and print inspection of the printed colors, information about location or measuring position.

The following is a summary list of reference numerals and the corresponding structure used in the above description of the invention:

1 carrier cylinder
2 measuring station
3 sleeve
4 adhesive tape
5 printing plate
6 rotary body, in particular printing plate
7 first motor
8 printing press, in particular flexographic printing press
9 printing unit
10 dryer
11 print substrate
12 measuring rings
13 elevated areas/topography
14 surface
15 anilox roller/anilox cylinder
16 printing cylinder
17 impression cylinder/print substrate transport cylinder
18 measuring unit
19 radiation sources, in particular light sources
20 reflector
21 radiation receiver, in particular light receiver, for example cameras
22 rotational axis
23 light curtain/emitted light
24 shadow
25 reflected light
26 working width
27 axial direction
28 direction of movement
29 second motor
30 reference object/line-shaped object, in particular thread/string/blade/beam
31 reference line
32 distance
33 lateral surface
34 unit
35 circumferential direction
36 shadow
37 sensor
38 identifying feature
39 digital processor
40 digital memory
41 drive side (DS)
42 operating side (OS)
43 unit for detecting the dot density 44 laser micrometer
45 third monitor
46 measuring line
47 measuring strip
48 multiple measuring lines
50 printing region
51 non-printing region
52 enveloping radius/envelope
53 printing dot of the printing plate
54 barely still printing dot of the printing plate
55 non-printing dot of the printing plate
56 lowest dot
57 radial distance
29b further second motor
39b further second processor
R radial distance
D diameter

The invention claimed is:

1. A device for measuring elevated areas of the surface of a rotary body configured as a cylinder, a roller, a sleeve or a plate for a printing press, the rotary body having a contour producing a shadow, the device comprising:
   a first motor for rotating the rotary body about a rotational axis; and
   a measuring unit for contactless measurement, said measuring unit including at least one radiation source and at least one area scan camera;
   said measuring unit for contactless measurement including a reference object, said reference object being a taut string or a taut wire or a taut carbon fiber tensioned parallel to said rotational axis, and said reference object causing a shadow;
   said at least one radiation source producing a light curtain as emitted light; and
   said at least one area scan camera receiving the emitted light without the shadow produced by the contour of the rotary body.

2. The device according to claim 1, wherein said at least one area scan camera receives the emitted light without the shadow caused by said reference object.

3. The device according to claim 2, which further comprises a second motor for allowing said measuring unit to be adjusted perpendicularly to said rotational axis.

4. The device according to claim 3, wherein said second motor adjusts said reference object perpendicularly to said rotational axis.

5. The device according to claim 4, which further comprises a further second motor adjusting said reference object perpendicularly to said rotational axis.

6. The device according to claim 1, wherein said at least one radiation source irradiates at least one region of the surface.

7. The device according to claim 6, wherein said at least one radiation source is a light source.

8. The device according to claim 2, wherein said reference object is stationary in a direction parallel to said rotational axis.

9. The device according to claim 3, which further comprises a third motor configured to move said at least one radiation source and said at least one camera parallel to said rotational axis.

10. The device according to claim 1, wherein said measuring unit includes at least one reflector.

11. The device according to claim 2, wherein said at least one camera records at least one shared image, a shared image sequence, or a shared film of an axial region of a contour of the rotary body and of an identical axial region of said reference object or a contour of said reference object.

12. The device according to claim 11, which further comprises a processor for evaluating the shared image, the shared image sequence or the shared film and thereby determining radial distances between individual elevated areas of the surface and said rotational axis.

13. The device according to claim 12, which further comprises a digital memory for storing said radial distances or values derived from said radial distances as data.

14. A system, comprising:
   a device according to claim 13; and
   a flexographic printing press including:
      at least one printing unit having an impression cylinder,
      at least one flexographic printing cylinder,
      at least one anilox roller,
      at least one drive for setting a contact pressure between said at least one flexographic printing cylinder and at least one of said impression cylinder or said anilox roller, and
      said processor for receiving the data and using the data for setting the contact pressure.

* * * * *